United States Patent [19]
Hayashi et al.

[11] Patent Number: 5,968,380
[45] Date of Patent: Oct. 19, 1999

[54] METHOD FOR PRODUCING LASER-WELDED TUBES AND APPARATUS FOR PRODUCING THE SAME

[75] Inventors: Tomotaka Hayashi; Youji Inaba, both of Osaka, Japan

[73] Assignee: Sumitomo Metal Industries Limited, Osaka, Japan

[21] Appl. No.: 08/996,906

[22] Filed: Dec. 23, 1997

Related U.S. Application Data

[63] Continuation-in-part of application No. 08/522,248, Sep. 7, 1995, abandoned, which is a continuation of application No. PCT/JP95/01464, Jul. 21, 1995.

[30] Foreign Application Priority Data

Jul. 27, 1994 [JP] Japan ..................................... 6-175021

[51] Int. Cl.⁶ .................................................. B23K 26/00
[52] U.S. Cl. .................................. 219/121.64; 219/61.2; 219/121.63
[58] Field of Search ........................ 219/121.63, 121.64, 219/617, 59.1, 61.2

[56] References Cited

U.S. PATENT DOCUMENTS

| | | | |
|---|---|---|---|
| 3,379,355 | 4/1968 | Bobrowski | 228/25 |
| 3,755,884 | 9/1973 | Dupy | 228/125 |
| 3,819,898 | 6/1974 | Boston | 219/612 |
| 4,129,062 | 12/1978 | Bergmann et al. | 409/140 |
| 4,649,256 | 3/1987 | Minamida et al. | 219/121.64 |
| 5,140,123 | 8/1992 | Mitani | 219/61.2 |
| 5,192,013 | 3/1993 | Abbey, III et al. | 228/13 |
| 5,900,079 | 5/1999 | Ono et al. | 219/121.64 |

FOREIGN PATENT DOCUMENTS

| | | |
|---|---|---|
| 61-270339 | 11/1986 | Japan . |
| 2-70379 | 3/1990 | Japan . |
| 2-48349 | 10/1990 | Japan . |
| 3-291176 | 12/1991 | Japan . |
| 4-258390 | 9/1992 | Japan . |
| 5-277769 | 10/1993 | Japan . |

*Primary Examiner*—Geoffrey S. Evans
*Attorney, Agent, or Firm*—Burns, Doane, Swecker & Mathis, LLP

[57] ABSTRACT

In case of producing a welded tube from a metal band by using laser welding, edges of the metal band are preheated so that the temperature at the edges of the metal band before laser welding is not less than a predetermined temperature, the preheated abutting edges of the metal band are laser-welded to form a welded tube and welding beads generated on the outer and/or inner surfaces of the welded tube having been produced are eliminated by cutting. The predetermined temperature is determined depending on the thickness of the metal band and the time from the start of laser welding to the cutting of the welding beads. The edges of the metal band are preheated before welding to prevent the welding beads from being hardened by quick cooling at the welded section after laser welding.

5 Claims, 20 Drawing Sheets a: NO PREHEATING LASER WELDING
(PRIOR ART)
b: PREHEATING (600°C) + LASER WELDING
(PRESENT INVENTION)
c: PREHEATING (1100°C) + LASER WELDING
(PRESENT INVENTION)

FIG. 3

| TEST No. | MATERIAL X60 | | (c) | (d) | (e) | (f) | (g) | (h) | (i) |
|---|---|---|---|---|---|---|---|---|---|
| | (a) | (b) | | | | | | | |
| A-1 | 50.8 | 6 | 0 | 4 | 11 | 0.2 | 0.050 | × | × |
| A-2 | 50.8 | 6 | 0 | 8 | 21 | 0.2 | 0.025 | × | × |
| A-3 | 50.8 | 6 | 0 | 12 | 32 | 0.2 | 0.017 | × | × |
| A-4 | 50.8 | 6 | 0 | 16 | 43 | 0.2 | 0.013 | × | × |
| A-5 | 50.8 | 6 | 0 | 20 | 53 | 0.2 | 0.010 | × | × |
| A-6 | 50.8 | 6 | 200 | 4 | 9 | 0.2 | 0.050 | × | × |
| A-7 | 50.8 | 6 | 200 | 8 | 19 | 0.2 | 0.025 | × | × |
| A-8 | 50.8 | 6 | 200 | 12 | 28 | 0.2 | 0.017 | × | × |
| A-9 | 50.8 | 6 | 200 | 16 | 38 | 0.2 | 0.013 | × | × |
| A-10 | 50.8 | 6 | 200 | 20 | 47 | 0.2 | 0.010 | × | × |
| A-11 | 50.8 | 6 | 400 | 4 | 8 | 0.2 | 0.050 | × | × |
| A-12 | 50.8 | 6 | 400 | 8 | 17 | 0.2 | 0.025 | × | × |
| A-13 | 50.8 | 6 | 400 | 12 | 25 | 0.2 | 0.017 | × | × |
| A-14 | 50.8 | 6 | 400 | 16 | 34 | 0.2 | 0.013 | × | × |
| A-15 | 50.8 | 6 | 400 | 20 | 42 | 0.2 | 0.010 | × | × |
| A-16 | 50.8 | 6 | 600 | 4 | 7 | 0.2 | 0.050 | ○ | ○ |
| A-17 | 50.8 | 6 | 600 | 8 | 15 | 0.2 | 0.025 | ○ | ○ |
| A-18 | 50.8 | 6 | 600 | 12 | 22 | 0.2 | 0.017 | ○ | ○ |
| A-19 | 50.8 | 6 | 600 | 16 | 30 | 0.2 | 0.013 | ○ | ○ |
| A-20 | 50.8 | 6 | 600 | 20 | 37 | 0.2 | 0.010 | ○ | ○ |
| A-21 | 50.8 | 6 | 800 | 4 | 7 | 0.2 | 0.050 | ○ | ○ |
| A-22 | 50.8 | 6 | 800 | 8 | 13 | 0.2 | 0.025 | ○ | ○ |
| A-23 | 50.8 | 6 | 800 | 12 | 20 | 0.2 | 0.017 | ○ | ○ |
| A-24 | 50.8 | 6 | 800 | 16 | 26 | 0.2 | 0.013 | ○ | ○ |
| A-25 | 50.8 | 6 | 800 | 20 | 33 | 0.2 | 0.010 | ○ | ○ |
| A-26 | 50.8 | 6 | 1000 | 4 | 6 | 0.2 | 0.050 | ○ | ○ |
| A-27 | 50.8 | 6 | 1000 | 8 | 12 | 0.2 | 0.025 | ○ | ○ |
| A-28 | 50.8 | 6 | 1000 | 12 | 18 | 0.2 | 0.017 | ○ | ○ |

(a) : OUTER DIAMETER d (mm)   (b) : WALL THICKNESS a (mm)
(c) : PREHEATING TEMPERATURE T (°C)   (d) : WELDING SPEED (m/min)
(e) : LASER OUTPUT (kW)   (f) : CUTTING POSITION (m)
(g) : TIME TO CUTTING t (min)   (h) : CUTTING (○ : possible  × : impossible)
(i) : CONDITION (○ : satisfied  × : not satisfied)

FIG. 4

| TEST No. | MATERIAL X60 (a) | (b) | (c) | (d) | (e) | (f) | (g) | (h) | (i) |
|---|---|---|---|---|---|---|---|---|---|
| A-29 | 50.8 | 6 | 1000 | 16 | 23 | 0.2 | 0.013 | ○ | ○ |
| A-30 | 50.8 | 6 | 1000 | 20 | 29 | 0.2 | 0.010 | ○ | ○ |
| A-31 | 50.8 | 6 | 1200 | 4 | 5 | 0.2 | 0.050 | ○ | ○ |
| A-32 | 50.8 | 6 | 1200 | 8 | 10 | 0.2 | 0.025 | ○ | ○ |
| A-33 | 50.8 | 6 | 1200 | 12 | 16 | 0.2 | 0.017 | ○ | ○ |
| A-34 | 50.8 | 6 | 1200 | 16 | 21 | 0.2 | 0.013 | ○ | ○ |
| A-35 | 50.8 | 6 | 1200 | 20 | 26 | 0.2 | 0.010 | ○ | ○ |
| A-36 | 50.8 | 6 | 0 | 12 | 32 | 1 | 0.083 | × | × |
| A-37 | 50.8 | 6 | 0 | 16 | 43 | 1 | 0.063 | × | × |
| A-38 | 50.8 | 6 | 0 | 20 | 53 | 1 | 0.050 | × | × |
| A-39 | 50.8 | 6 | 200 | 12 | 28 | 1 | 0.083 | × | × |
| A-40 | 50.8 | 6 | 200 | 16 | 38 | 1 | 0.063 | × | × |
| A-41 | 50.8 | 6 | 200 | 20 | 47 | 1 | 0.050 | × | × |
| A-42 | 50.8 | 6 | 400 | 12 | 25 | 1 | 0.083 | × | × |
| A-43 | 50.8 | 6 | 400 | 16 | 34 | 1 | 0.063 | × | × |
| A-44 | 50.8 | 6 | 400 | 20 | 42 | 1 | 0.050 | × | × |
| A-45 | 50.8 | 6 | 600 | 12 | 22 | 1 | 0.083 | × | × |
| A-46 | 50.8 | 6 | 600 | 16 | 30 | 1 | 0.063 | × | × |
| A-47 | 50.8 | 6 | 600 | 20 | 37 | 1 | 0.050 | ○ | ○ |
| A-48 | 50.8 | 6 | 800 | 12 | 20 | 1 | 0.083 | ○ | ○ |
| A-49 | 50.8 | 6 | 800 | 16 | 26 | 1 | 0.063 | ○ | ○ |
| A-50 | 50.8 | 6 | 800 | 20 | 33 | 1 | 0.050 | ○ | ○ |
| A-51 | 50.8 | 6 | 1000 | 12 | 18 | 1 | 0.083 | ○ | ○ |
| A-52 | 50.8 | 6 | 1000 | 16 | 23 | 1 | 0.063 | ○ | ○ |
| A-53 | 50.8 | 6 | 1000 | 20 | 29 | 1 | 0.050 | ○ | ○ |
| A-54 | 50.8 | 6 | 1200 | 12 | 16 | 1 | 0.083 | ○ | ○ |
| A-55 | 50.8 | 6 | 1200 | 16 | 21 | 1 | 0.063 | ○ | ○ |
| A-56 | 50.8 | 6 | 1200 | 20 | 26 | 1 | 0.050 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○: possible  ×: impossible)
(i) : CONDITION (○: satisfied  ×: not satisfied)

FIG. 6

| TEST No. | MATERIAL X60 (a) | (b) | (c) | (d) | (e) | (f) | (g) | (h) | (i) |
|---|---|---|---|---|---|---|---|---|---|
| B-1 | 50.8 | 3 | 0 | 4 | 5 | 0.2 | 0.050 | × | × |
| B-2 | 50.8 | 3 | 0 | 8 | 11 | 0.2 | 0.025 | × | × |
| B-3 | 50.8 | 3 | 0 | 12 | 16 | 0.2 | 0.017 | × | × |
| B-4 | 50.8 | 3 | 0 | 16 | 21 | 0.2 | 0.013 | × | × |
| B-5 | 50.8 | 3 | 0 | 20 | 27 | 0.2 | 0.010 | × | × |
| B-6 | 50.8 | 3 | 200 | 4 | 5 | 0.2 | 0.050 | × | × |
| B-7 | 50.8 | 3 | 200 | 8 | 9 | 0.2 | 0.025 | × | × |
| B-8 | 50.8 | 3 | 200 | 12 | 14 | 0.2 | 0.017 | × | × |
| B-9 | 50.8 | 3 | 200 | 16 | 19 | 0.2 | 0.013 | × | × |
| B-10 | 50.8 | 3 | 200 | 20 | 24 | 0.2 | 0.010 | × | × |
| B-11 | 50.8 | 3 | 400 | 4 | 4 | 0.2 | 0.050 | × | × |
| B-12 | 50.8 | 3 | 400 | 8 | 8 | 0.2 | 0.025 | × | × |
| B-13 | 50.8 | 3 | 400 | 12 | 13 | 0.2 | 0.017 | × | × |
| B-14 | 50.8 | 3 | 400 | 16 | 17 | 0.2 | 0.013 | × | × |
| B-15 | 50.8 | 3 | 400 | 20 | 21 | 0.2 | 0.010 | × | × |
| B-16 | 50.8 | 3 | 600 | 4 | 4 | 0.2 | 0.050 | × | × |
| B-17 | 50.8 | 3 | 600 | 8 | 7 | 0.2 | 0.025 | × | × |
| B-18 | 50.8 | 3 | 600 | 12 | 11 | 0.2 | 0.017 | ○ | ○ |
| B-19 | 50.8 | 3 | 600 | 16 | 15 | 0.2 | 0.013 | ○ | ○ |
| B-20 | 50.8 | 3 | 600 | 20 | 19 | 0.2 | 0.010 | ○ | ○ |
| B-21 | 50.8 | 3 | 800 | 4 | 3 | 0.2 | 0.050 | × | × |
| B-22 | 50.8 | 3 | 800 | 8 | 7 | 0.2 | 0.025 | ○ | ○ |
| B-23 | 50.8 | 3 | 800 | 12 | 10 | 0.2 | 0.017 | ○ | ○ |
| B-24 | 50.8 | 3 | 800 | 16 | 13 | 0.2 | 0.013 | ○ | ○ |
| B-25 | 50.8 | 3 | 800 | 20 | 17 | 0.2 | 0.010 | ○ | ○ |
| B-26 | 50.8 | 3 | 1000 | 4 | 3 | 0.2 | 0.050 | × | × |
| B-27 | 50.8 | 3 | 1000 | 8 | 6 | 0.2 | 0.025 | ○ | ○ |
| B-28 | 50.8 | 3 | 1000 | 12 | 9 | 0.2 | 0.017 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○:possible ×:impossible)
(i) : CONDITION (○:satisfied ×:not satisfied)

FIG. 7

| TEST No. | MATERIAL X60 (a) | (b) | (c) | (d) | (e) | (f) | (g) | (h) | (i) |
|---|---|---|---|---|---|---|---|---|---|
| B-29 | 50.8 | 3 | 1000 | 16 | 12 | 0.2 | 0.013 | ○ | ○ |
| B-30 | 50.8 | 3 | 1000 | 20 | 15 | 0.2 | 0.010 | ○ | ○ |
| B-31 | 50.8 | 3 | 1200 | 4 | 3 | 0.2 | 0.050 | ○ | ○ |
| B-32 | 50.8 | 3 | 1200 | 8 | 5 | 0.2 | 0.025 | ○ | ○ |
| B-33 | 50.8 | 3 | 1200 | 12 | 8 | 0.2 | 0.017 | ○ | ○ |
| B-34 | 50.8 | 3 | 1200 | 16 | 10 | 0.2 | 0.013 | ○ | ○ |
| B-35 | 50.8 | 3 | 1200 | 20 | 13 | 0.2 | 0.010 | ○ | ○ |
| B-36 | 50.8 | 3 | 0 | 12 | 16 | 1 | 0.083 | × | × |
| B-37 | 50.8 | 3 | 0 | 16 | 21 | 1 | 0.063 | × | × |
| B-38 | 50.8 | 3 | 0 | 20 | 27 | 1 | 0.050 | × | × |
| B-39 | 50.8 | 3 | 200 | 12 | 14 | 1 | 0.083 | × | × |
| B-40 | 50.8 | 3 | 200 | 16 | 19 | 1 | 0.063 | × | × |
| B-41 | 50.8 | 3 | 200 | 20 | 24 | 1 | 0.050 | × | × |
| B-42 | 50.8 | 3 | 400 | 12 | 13 | 1 | 0.083 | × | × |
| B-43 | 50.8 | 3 | 400 | 16 | 17 | 1 | 0.063 | × | × |
| B-44 | 50.8 | 3 | 400 | 20 | 21 | 1 | 0.050 | × | × |
| B-45 | 50.8 | 3 | 600 | 12 | 11 | 1 | 0.083 | × | × |
| B-46 | 50.8 | 3 | 600 | 16 | 15 | 1 | 0.063 | × | × |
| B-47 | 50.8 | 3 | 600 | 20 | 19 | 1 | 0.050 | × | × |
| B-48 | 50.8 | 3 | 800 | 12 | 10 | 1 | 0.083 | × | × |
| B-49 | 50.8 | 3 | 800 | 16 | 13 | 1 | 0.063 | × | × |
| B-50 | 50.8 | 3 | 800 | 20 | 17 | 1 | 0.050 | × | × |
| B-51 | 50.8 | 3 | 1000 | 12 | 9 | 1 | 0.083 | × | × |
| B-52 | 50.8 | 3 | 1000 | 16 | 12 | 1 | 0.063 | × | × |
| B-53 | 50.8 | 3 | 1000 | 20 | 15 | 1 | 0.050 | × | × |
| B-54 | 50.8 | 3 | 1200 | 12 | 8 | 1 | 0.083 | × | × |
| B-55 | 50.8 | 3 | 1200 | 16 | 10 | 1 | 0.063 | × | × |
| B-56 | 50.8 | 3 | 1200 | 20 | 13 | 1 | 0.050 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○ : possible  × : impossible)
(i) : CONDITION (○ : satisfied  × : not satisfied)

FIG. 9

| TEST No. | MATERIAL X60 | | (c) | (d) | (e) | (f) | (g) | (h) | (i) |
|---|---|---|---|---|---|---|---|---|---|
| | (a) | (b) | | | | | | | |
| C-1 | 114 | 6 | 0 | 4 | 11 | 0.2 | 0.050 | × | × |
| C-2 | 114 | 6 | 0 | 8 | 21 | 0.2 | 0.025 | × | × |
| C-3 | 114 | 6 | 0 | 12 | 32 | 0.2 | 0.017 | × | × |
| C-4 | 114 | 6 | 0 | 16 | 43 | 0.2 | 0.013 | × | × |
| C-5 | 114 | 6 | 0 | 20 | 53 | 0.2 | 0.010 | × | × |
| C-6 | 114 | 6 | 200 | 4 | 9 | 0.2 | 0.050 | × | × |
| C-7 | 114 | 6 | 200 | 8 | 19 | 0.2 | 0.025 | × | × |
| C-8 | 114 | 6 | 200 | 12 | 28 | 0.2 | 0.017 | × | × |
| C-9 | 114 | 6 | 200 | 16 | 38 | 0.2 | 0.013 | × | × |
| C-10 | 114 | 6 | 200 | 20 | 47 | 0.2 | 0.010 | × | × |
| C-11 | 114 | 6 | 400 | 4 | 8 | 0.2 | 0.050 | × | × |
| C-12 | 114 | 6 | 400 | 8 | 17 | 0.2 | 0.025 | × | × |
| C-13 | 114 | 6 | 400 | 12 | 25 | 0.2 | 0.017 | × | × |
| C-14 | 114 | 6 | 400 | 16 | 34 | 0.2 | 0.013 | × | × |
| C-15 | 114 | 6 | 400 | 20 | 42 | 0.2 | 0.010 | × | × |
| C-16 | 114 | 6 | 600 | 4 | 7 | 0.2 | 0.050 | ○ | ○ |
| C-17 | 114 | 6 | 600 | 8 | 15 | 0.2 | 0.025 | ○ | ○ |
| C-18 | 114 | 6 | 600 | 12 | 22 | 0.2 | 0.017 | ○ | ○ |
| C-19 | 114 | 6 | 600 | 16 | 30 | 0.2 | 0.013 | ○ | ○ |
| C-20 | 114 | 6 | 600 | 20 | 37 | 0.2 | 0.010 | ○ | ○ |
| C-21 | 114 | 6 | 800 | 4 | 7 | 0.2 | 0.050 | ○ | ○ |
| C-22 | 114 | 6 | 800 | 8 | 13 | 0.2 | 0.025 | ○ | ○ |
| C-23 | 114 | 6 | 800 | 12 | 20 | 0.2 | 0.017 | ○ | ○ |
| C-24 | 114 | 6 | 800 | 16 | 26 | 0.2 | 0.013 | ○ | ○ |
| C-25 | 114 | 6 | 800 | 20 | 33 | 0.2 | 0.010 | ○ | ○ |
| C-26 | 114 | 6 | 1000 | 4 | 6 | 0.2 | 0.050 | ○ | ○ |
| C-27 | 114 | 6 | 1000 | 8 | 12 | 0.2 | 0.025 | ○ | ○ |
| C-28 | 114 | 6 | 1000 | 12 | 18 | 0.2 | 0.017 | ○ | ○ |

(a) : OUTER DIAMETER d (mm)   (b) : WALL THICKNESS a (mm)
(c) : PREHEATING TEMPERATURE T (°C)   (d) : WELDING SPEED (m/min)
(e) : LASER OUTPUT (kW)   (f) : CUTTING POSITION (m)
(g) : TIME TO CUTTING t (min)   (h) : CUTTING (○:possible  ×:impossible)
(i) : CONDITION (○:satisfied  ×:not satisfied)

FIG. 10

| TEST No. | MATERIAL X60 (a) | (b) | (c) | (d) | (e) | (f) | (g) | (h) | (i) |
|---|---|---|---|---|---|---|---|---|---|
| C-29 | 114 | 6 | 1000 | 16 | 23 | 0.2 | 0.013 | ○ | ○ |
| C-30 | 114 | 6 | 1000 | 20 | 29 | 0.2 | 0.010 | ○ | ○ |
| C-31 | 114 | 6 | 1200 | 4 | 5 | 0.2 | 0.050 | ○ | ○ |
| C-32 | 114 | 6 | 1200 | 8 | 10 | 0.2 | 0.025 | ○ | ○ |
| C-33 | 114 | 6 | 1200 | 12 | 16 | 0.2 | 0.017 | ○ | ○ |
| C-34 | 114 | 6 | 1200 | 16 | 21 | 0.2 | 0.013 | ○ | ○ |
| C-35 | 114 | 6 | 1200 | 20 | 26 | 0.2 | 0.010 | ○ | ○ |
| C-36 | 114 | 6 | 0 | 12 | 32 | 1 | 0.083 | × | × |
| C-37 | 114 | 6 | 0 | 16 | 43 | 1 | 0.063 | × | × |
| C-38 | 114 | 6 | 0 | 20 | 53 | 1 | 0.050 | × | × |
| C-39 | 114 | 6 | 200 | 12 | 28 | 1 | 0.083 | × | × |
| C-40 | 114 | 6 | 200 | 16 | 38 | 1 | 0.063 | × | × |
| C-41 | 114 | 6 | 200 | 20 | 47 | 1 | 0.050 | × | × |
| C-42 | 114 | 6 | 400 | 12 | 25 | 1 | 0.083 | × | × |
| C-43 | 114 | 6 | 400 | 16 | 34 | 1 | 0.063 | × | × |
| C-44 | 114 | 6 | 400 | 20 | 42 | 1 | 0.050 | × | × |
| C-45 | 114 | 6 | 600 | 12 | 22 | 1 | 0.083 | × | × |
| C-46 | 114 | 6 | 600 | 16 | 30 | 1 | 0.063 | × | × |
| C-47 | 114 | 6 | 600 | 20 | 37 | 1 | 0.050 | ○ | ○ |
| C-48 | 114 | 6 | 800 | 12 | 20 | 1 | 0.083 | ○ | ○ |
| C-49 | 114 | 6 | 800 | 16 | 26 | 1 | 0.063 | ○ | ○ |
| C-50 | 114 | 6 | 800 | 20 | 33 | 1 | 0.050 | ○ | ○ |
| C-51 | 114 | 6 | 1000 | 12 | 18 | 1 | 0.083 | ○ | ○ |
| C-52 | 114 | 6 | 1000 | 16 | 23 | 1 | 0.063 | ○ | ○ |
| C-53 | 114 | 6 | 1000 | 20 | 29 | 1 | 0.050 | ○ | ○ |
| C-54 | 114 | 6 | 1200 | 12 | 16 | 1 | 0.083 | ○ | ○ |
| C-55 | 114 | 6 | 1200 | 16 | 21 | 1 | 0.063 | ○ | ○ |
| C-56 | 114 | 6 | 1200 | 20 | 26 | 1 | 0.050 | ○ | ○ |

(a) : OUTER DIAMETER d (mm)　　(b) : WALL THICKNESS a (mm)
(c) : PREHEATING TEMPERATURE T (°C)　　(d) : WELDING SPEED (m/min)
(e) : LASER OUTPUT (kW)　　(f) : CUTTING POSITION (m)
(g) : TIME TO CUTTING t (min)　　(h) : CUTTING (○:possible ×:impossible)
(i) : CONDITION (○:satisfied ×:not satisfied)

FIG. 12

| TEST No. | MATERIAL X60 | | (c) | (d) | (e) | (f) | (g) | (h) | (i) |
|---|---|---|---|---|---|---|---|---|---|
| | (a) | (b) | | | | | | | |
| D-1 | 114 | 12.7 | 0 | 4 | 23 | 0.2 | 0.050 | × | × |
| D-2 | 114 | 12.7 | 0 | 8 | 45 | 0.2 | 0.025 | × | × |
| D-3 | 114 | 12.7 | 0 | 12 | 68 | 0.2 | 0.017 | × | × |
| D-4 | 114 | 12.7 | 0 | 16 | 90 | 0.2 | 0.013 | × | × |
| D-5 | 114 | 12.7 | 0 | 20 | 113 | 0.2 | 0.010 | × | × |
| D-6 | 114 | 12.7 | 200 | 4 | 20 | 0.2 | 0.050 | × | × |
| D-7 | 114 | 12.7 | 200 | 8 | 40 | 0.2 | 0.025 | × | × |
| D-8 | 114 | 12.7 | 200 | 12 | 60 | 0.2 | 0.017 | × | × |
| D-9 | 114 | 12.7 | 200 | 16 | 80 | 0.2 | 0.013 | × | × |
| D-10 | 114 | 12.7 | 200 | 20 | 100 | 0.2 | 0.010 | × | × |
| D-11 | 114 | 12.7 | 400 | 4 | 18 | 0.2 | 0.050 | × | × |
| D-12 | 114 | 12.7 | 400 | 8 | 36 | 0.2 | 0.025 | × | × |
| D-13 | 114 | 12.7 | 400 | 12 | 53 | 0.2 | 0.017 | × | × |
| D-14 | 114 | 12.7 | 400 | 16 | 71 | 0.2 | 0.013 | × | × |
| D-15 | 114 | 12.7 | 400 | 20 | 89 | 0.2 | 0.010 | × | × |
| D-16 | 114 | 12.7 | 600 | 4 | 16 | 0.2 | 0.050 | ○ | ○ |
| D-17 | 114 | 12.7 | 600 | 8 | 32 | 0.2 | 0.025 | ○ | ○ |
| D-18 | 114 | 12.7 | 600 | 12 | 47 | 0.2 | 0.017 | ○ | ○ |
| D-19 | 114 | 12.7 | 600 | 16 | 63 | 0.2 | 0.013 | ○ | ○ |
| D-20 | 114 | 12.7 | 600 | 20 | 79 | 0.2 | 0.010 | ○ | ○ |
| D-21 | 114 | 12.7 | 800 | 4 | 14 | 0.2 | 0.050 | ○ | ○ |
| D-22 | 114 | 12.7 | 800 | 8 | 28 | 0.2 | 0.025 | ○ | ○ |
| D-23 | 114 | 12.7 | 800 | 12 | 42 | 0.2 | 0.017 | ○ | ○ |
| D-24 | 114 | 12.7 | 800 | 16 | 56 | 0.2 | 0.013 | ○ | ○ |
| D-25 | 114 | 12.7 | 800 | 20 | 70 | 0.2 | 0.010 | ○ | ○ |
| D-26 | 114 | 12.7 | 1000 | 4 | 12 | 0.2 | 0.050 | ○ | ○ |
| D-27 | 114 | 12.7 | 1000 | 8 | 25 | 0.2 | 0.025 | ○ | ○ |
| D-28 | 114 | 12.7 | 1000 | 12 | 37 | 0.2 | 0.017 | ○ | ○ |

(a) : OUTER DIAMETER d (mm)　　(b) : WALL THICKNESS a (mm)
(c) : PREHEATING TEMPERATURE T (°C)　　(d) : WELDING SPEED (m/min)
(e) : LASER OUTPUT (kW)　(f) : CUTTING POSITION (m)
(g) : TIME TO CUTTING t (min)　　(h) : CUTTING (○:possible ×:impossible)
(i) : CONDITION (○:satisfied ×:not satisfied)

FIG. 13

| TEST No. | MATERIAL X60 (a) | (b) | (c) | (d) | (e) | (f) | (g) | (h) | (i) |
|---|---|---|---|---|---|---|---|---|---|
| D-29 | 114 | 12.7 | 1000 | 16 | 50 | 0.2 | 0.013 | ○ | ○ |
| D-30 | 114 | 12.7 | 1000 | 20 | 62 | 0.2 | 0.010 | ○ | ○ |
| D-31 | 114 | 12.7 | 1200 | 4 | 11 | 0.2 | 0.050 | ○ | ○ |
| D-32 | 114 | 12.7 | 1200 | 8 | 22 | 0.2 | 0.025 | ○ | ○ |
| D-33 | 114 | 12.7 | 1200 | 12 | 33 | 0.2 | 0.017 | ○ | ○ |
| D-34 | 114 | 12.7 | 1200 | 16 | 44 | 0.2 | 0.013 | ○ | ○ |
| D-35 | 114 | 12.7 | 1200 | 20 | 55 | 0.2 | 0.010 | ○ | ○ |
| D-36 | 114 | 12.7 | 0 | 12 | 68 | 1 | 0.083 | × | × |
| D-37 | 114 | 12.7 | 0 | 16 | 90 | 1 | 0.063 | × | × |
| D-38 | 114 | 12.7 | 0 | 20 | 113 | 1 | 0.050 | × | × |
| D-39 | 114 | 12.7 | 200 | 12 | 60 | 1 | 0.083 | × | × |
| D-40 | 114 | 12.7 | 200 | 16 | 80 | 1 | 0.063 | × | × |
| D-41 | 114 | 12.7 | 200 | 20 | 100 | 1 | 0.050 | × | × |
| D-42 | 114 | 12.7 | 400 | 12 | 53 | 1 | 0.083 | × | × |
| D-43 | 114 | 12.7 | 400 | 16 | 71 | 1 | 0.063 | × | × |
| D-44 | 114 | 12.7 | 400 | 20 | 89 | 1 | 0.050 | × | × |
| D-45 | 114 | 12.7 | 600 | 12 | 47 | 1 | 0.083 | ○ | ○ |
| D-46 | 114 | 12.7 | 600 | 16 | 63 | 1 | 0.063 | ○ | ○ |
| D-47 | 114 | 12.7 | 600 | 20 | 79 | 1 | 0.050 | ○ | ○ |
| D-48 | 114 | 12.7 | 800 | 12 | 42 | 1 | 0.083 | ○ | ○ |
| D-49 | 114 | 12.7 | 800 | 16 | 56 | 1 | 0.063 | ○ | ○ |
| D-50 | 114 | 12.7 | 800 | 20 | 70 | 1 | 0.050 | ○ | ○ |
| D-51 | 114 | 12.7 | 1000 | 12 | 37 | 1 | 0.083 | ○ | ○ |
| D-52 | 114 | 12.7 | 1000 | 16 | 50 | 1 | 0.063 | ○ | ○ |
| D-53 | 114 | 12.7 | 1000 | 20 | 62 | 1 | 0.050 | ○ | ○ |
| D-54 | 114 | 12.7 | 1200 | 12 | 33 | 1 | 0.083 | ○ | ○ |
| D-55 | 114 | 12.7 | 1200 | 16 | 44 | 1 | 0.063 | ○ | ○ |
| D-56 | 114 | 12.7 | 1200 | 20 | 55 | 1 | 0.050 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○:possible  ×:impossible)
(i) : CONDITION (○:satisfied  ×:not satisfied)

FIG. 15

| TEST No. | MATERIAL SUS304 | | (c) | (d) | (e) | (f) | (g) | (h) | (i) |
|---|---|---|---|---|---|---|---|---|---|
| | (a) | (b) | | | | | | | |
| E-1 | 50.8 | 6 | 0 | 4 | 11 | 0.2 | 0.050 | × | × |
| E-2 | 50.8 | 6 | 0 | 8 | 21 | 0.2 | 0.025 | × | × |
| E-3 | 50.8 | 6 | 0 | 12 | 32 | 0.2 | 0.017 | × | × |
| E-4 | 50.8 | 6 | 0 | 16 | 43 | 0.2 | 0.013 | × | × |
| E-5 | 50.8 | 6 | 0 | 20 | 53 | 0.2 | 0.010 | × | × |
| E-6 | 50.8 | 6 | 200 | 4 | 9 | 0.2 | 0.050 | × | × |
| E-7 | 50.8 | 6 | 200 | 8 | 19 | 0.2 | 0.025 | × | × |
| E-8 | 50.8 | 6 | 200 | 12 | 28 | 0.2 | 0.017 | × | × |
| E-9 | 50.8 | 6 | 200 | 16 | 38 | 0.2 | 0.013 | × | × |
| E-10 | 50.8 | 6 | 200 | 20 | 47 | 0.2 | 0.010 | × | × |
| E-11 | 50.8 | 6 | 400 | 4 | 8 | 0.2 | 0.050 | × | × |
| E-12 | 50.8 | 6 | 400 | 8 | 17 | 0.2 | 0.025 | × | × |
| E-13 | 50.8 | 6 | 400 | 12 | 25 | 0.2 | 0.017 | × | × |
| E-14 | 50.8 | 6 | 400 | 16 | 34 | 0.2 | 0.013 | × | × |
| E-15 | 50.8 | 6 | 400 | 20 | 42 | 0.2 | 0.010 | × | × |
| E-16 | 50.8 | 6 | 600 | 4 | 7 | 0.2 | 0.050 | ○ | ○ |
| E-17 | 50.8 | 6 | 600 | 8 | 15 | 0.2 | 0.025 | ○ | ○ |
| E-18 | 50.8 | 6 | 600 | 12 | 22 | 0.2 | 0.017 | ○ | ○ |
| E-19 | 50.8 | 6 | 600 | 16 | 30 | 0.2 | 0.013 | ○ | ○ |
| E-20 | 50.8 | 6 | 600 | 20 | 37 | 0.2 | 0.010 | ○ | ○ |
| E-21 | 50.8 | 6 | 800 | 4 | 7 | 0.2 | 0.050 | ○ | ○ |
| E-22 | 50.8 | 6 | 800 | 8 | 13 | 0.2 | 0.025 | ○ | ○ |
| E-23 | 50.8 | 6 | 800 | 12 | 20 | 0.2 | 0.017 | ○ | ○ |
| E-24 | 50.8 | 6 | 800 | 16 | 26 | 0.2 | 0.013 | ○ | ○ |
| E-25 | 50.8 | 6 | 800 | 20 | 33 | 0.2 | 0.010 | ○ | ○ |
| E-26 | 50.8 | 6 | 1000 | 4 | 6 | 0.2 | 0.050 | ○ | ○ |
| E-27 | 50.8 | 6 | 1000 | 8 | 12 | 0.2 | 0.025 | ○ | ○ |
| E-28 | 50.8 | 6 | 1000 | 12 | 18 | 0.2 | 0.017 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○ : possible  × : impossible)
(i) : CONDITION (○ : satisfied  × : not satisfied)

FIG. 16

| TEST No. | MATERIAL SUS304 | | (c) | (d) | (e) | (f) | (g) | (h) | (i) |
|---|---|---|---|---|---|---|---|---|---|
| | (a) | (b) | | | | | | | |
| E-29 | 50.8 | 6 | 1000 | 16 | 23 | 0.2 | 0.013 | ○ | ○ |
| E-30 | 50.8 | 6 | 1000 | 20 | 29 | 0.2 | 0.010 | ○ | ○ |
| E-31 | 50.8 | 6 | 1200 | 4 | 5 | 0.2 | 0.050 | ○ | ○ |
| E-32 | 50.8 | 6 | 1200 | 8 | 10 | 0.2 | 0.025 | ○ | ○ |
| E-33 | 50.8 | 6 | 1200 | 12 | 16 | 0.2 | 0.017 | ○ | ○ |
| E-34 | 50.8 | 6 | 1200 | 16 | 21 | 0.2 | 0.013 | ○ | ○ |
| E-35 | 50.8 | 6 | 1200 | 20 | 26 | 0.2 | 0.010 | ○ | ○ |
| E-36 | 50.8 | 6 | 0 | 12 | 32 | 1.0 | 0.083 | × | × |
| E-37 | 50.8 | 6 | 0 | 16 | 43 | 1.0 | 0.063 | × | × |
| E-38 | 50.8 | 6 | 0 | 20 | 53 | 1.0 | 0.050 | × | × |
| E-39 | 50.8 | 6 | 200 | 12 | 28 | 1.0 | 0.083 | × | × |
| E-40 | 50.8 | 6 | 200 | 16 | 38 | 1.0 | 0.063 | × | × |
| E-41 | 50.8 | 6 | 200 | 20 | 47 | 1.0 | 0.050 | × | × |
| E-42 | 50.8 | 6 | 400 | 12 | 25 | 1.0 | 0.083 | × | × |
| E-43 | 50.8 | 6 | 400 | 16 | 34 | 1.0 | 0.063 | × | × |
| E-44 | 50.8 | 6 | 400 | 20 | 42 | 1.0 | 0.050 | × | × |
| E-45 | 50.8 | 6 | 600 | 12 | 22 | 1.0 | 0.083 | × | × |
| E-46 | 50.8 | 6 | 600 | 16 | 30 | 1.0 | 0.063 | × | × |
| E-47 | 50.8 | 6 | 600 | 20 | 37 | 1.0 | 0.050 | ○ | ○ |
| E-48 | 50.8 | 6 | 800 | 12 | 20 | 1.0 | 0.083 | ○ | ○ |
| E-49 | 50.8 | 6 | 800 | 16 | 26 | 1.0 | 0.063 | ○ | ○ |
| E-50 | 50.8 | 6 | 800 | 20 | 33 | 1.0 | 0.050 | ○ | ○ |
| E-51 | 50.8 | 6 | 1000 | 12 | 18 | 1.0 | 0.083 | ○ | ○ |
| E-52 | 50.8 | 6 | 1000 | 16 | 23 | 1.0 | 0.063 | ○ | ○ |
| E-53 | 50.8 | 6 | 1000 | 20 | 29 | 1.0 | 0.050 | ○ | ○ |
| E-54 | 50.8 | 6 | 1200 | 12 | 16 | 1.0 | 0.083 | ○ | ○ |
| E-55 | 50.8 | 6 | 1200 | 16 | 21 | 1.0 | 0.063 | ○ | ○ |
| E-56 | 50.8 | 6 | 1200 | 20 | 26 | 1.0 | 0.050 | ○ | ○ |

(a) : OUTER DIAMETER d (mm)  (b) : WALL THICKNESS a (mm)
(c) : PREHEATING TEMPERATURE T (°C)  (d) : WELDING SPEED (m/min)
(e) : LASER OUTPUT (kW)  (f) : CUTTING POSITION (m)
(g) : TIME TO CUTTING t (min)  (h) : CUTTING (○:possible  ×:impossible)
(i) : CONDITION (○:satisfied  ×:not satisfied)

METHOD FOR PRODUCING LASER-WELDED TUBES AND APPARATUS FOR PRODUCING THE SAME

This application is a continuation-in-part application of application Ser. No. 08/522,248 filed on Sep. 7, 1995, now abandoned, which is a continuation of PCT/JP95/01464, filed Jul. 21, 1995.

FIELD OF THE INVENTION

The present invention relates to a method for producing welded tubes from metal bands by using laser welding and an apparatus for producing the same.

DESCRIPTION OF RELATED ART

Laser welding makes high-speed welding possible, since the welding method has higher energy density at its heat source and therefore has a deeper melting depth than other welding methods. In addition, since the total amount of heat input can be decreased, the performance at welded sections can be made superior. For these reasons, laser welding has become a focus of attention as a welding method for producing steel tubes and application of laser welding to production of steel tubes is proceeding. When producing welded tubes by laser welding, welding beads of which inner and outer surfaces are swollen are formed at the outer and/or inner surfaces of welded sections in the same way as other fusion welding methods. It is therefore necessary to cut these beads. However, because of the reasons described below, it was not easy to cut the welding beads, and the machinability of the welding beads was inferior.

Laser welding is characterized in that the amount of welding heat input is small. However, from the viewpoint of welding bead cutting, the cooling speed of the welding beads after welding is high since the amount of welding heat input is small, and the temperature of the welding beads is fairly low at the cutting position. For this reason, the welding beads having been cooled to a low temperature have high material strength and thus require high cutting force, thereby reducing the machinability thereof. In this case, chatter is generated on the cutting surfaces. Furthermore, in a low-temperature condition, a very hard built-up edge is apt to be generated at the tip of a cutting tool. In case that such a built-up edge is formed, gouge and chatter are generated on the cutting surfaces. When the material of the metal band is non-austenitic steel, such as carbon steel, since the amount of welding heat input is small and the welding beads are cooled quickly, the welding beads may be sometimes subjected to martensitic transformation. In this case, the welding beads become very hard and cannot be cut.

Because of this difficulty in the cutting process of the welding beads, the technology for producing middle and large diameter welded tubes, wherein welding beads appear conspicuously, by using laser welding has not yet been established, and improvements in the cutting process are desired.

As a prior art related to the present invention, a method for producing electro-resistance-welded tubes has been disclosed in Japanese Patent Application Publication No. Hei 2-48349, which was proposed by the same applicant as that of the present invention. In the technology of the prior art, before the abutting edges of a metal band are welded, the edges are preheated by using a heating means which uses electric resistance, induction heating, arc or high-energy beams. The objects of the method are to reduce the power consumption of the heating means used for welding and to eliminate welding defects by minimizing the generation of oxides in the welded metal. These objects are thus different from those of the present invention described below.

One object of the present invention is to provide a method for producing laser-welded tubes and an apparatus for producing the same, wherein the cutting of welding beads formed on a laser-welded tube having been produced can be done easily and the accuracy of the finished dimensions of the welded tube can be improved by preheating the metal band to be welded at the time of producing a welded tube by using laser welding.

Another object of the invention is to provide a method for producing welded tubes and an apparatus for producing the same, wherein welding beads can be cut securely before the beads become hard by making a cutting tool movable in the transfer direction at a production line.

SUMMARY OF THE INVENTION

In the method for producing laser-welded tubes in accordance with the invention, the abutting edges of a metal band are preheated to a predetermined temperature before laser welding, the abutting edges of the metal band are then welded by laser welding and welding beads generated on the outer and/or inner surfaces of the welded tube having been produced are eliminated by cutting. The predetermined temperature is determined depending on the thickness of the metal band and the time from the start of laser welding to the cutting of the welding beads. More specifically, the temperature satisfies the following condition (1).

$$T \geq 380 \times \exp(8.4 \times t \times (6/a)^{1.3}) \quad (1)$$

where

T: Predetermined temperature (° C.) at the edges of the metal band before laser welding t: Time (minutes) from the start of laser welding to the cutting of the welding beads a: Thickness (mm) of a metal band to be welded Preheating the edges of the metal band before welding prevents the hardening of the welding beads due to quick cooling at the welded section after laser welding, thereby allowing the welding beads on the welded tube having been produced to be cut.

The apparatus for producing laser-welded tubes in accordance with the invention has preheating means for preheating the edges of a metal band, laser-welding means for forming a welded tube by laser-welding the preheated abutting edges of the metal band, and cutting means for cutting and eliminating welding beads from the welded tube having been formed. The cutting tool of the cutting means is movable in the longitudinal direction of the welded tube. Furthermore, the apparatus is provided with adjusting means for adjusting the preheating power of the preheating means and/or an adjusting means for adjusting the speed of transfer at a production line, so as to satisfy the above-mentioned condition (1).

Since the distance from the laser welding means to the cutting tool can be changed as desired, the apparatus can easily satisfy the above-mentioned condition (1). When the line speed is low, for example, time t from the start of laser welding to the elimination of the welding beads can be shortened by moving the cutting tool toward the laser welding means. The above-mentioned condition (1) is thus satisfied and the welding beads can be cut.

BRIEF DESCRIPTION OF THE DRAWINGS

FIG. 3 is a table showing the examples of the first test results obtained by using the method for producing laser-welded tubes in accordance with the invention;

FIG. 4 is a table showing the examples of the first test results obtained by using the method for producing laser-welded tubes in accordance with the invention;

FIG. 6 is a table showing the examples of the second test results obtained by using the method for producing laser-welded tubes in accordance with the invention;

FIG. 7 is a table showing the examples of the second test results obtained by using the method for producing laser-welded tubes in accordance with the invention;

FIG. 9 is a table showing the examples of the third test results obtained by using the method for producing laser-welded tubes in accordance with the invention;

FIG. 10 is a table showing the examples of the third test results obtained by using the method for producing laser-welded tubes in accordance with the invention;

FIG. 12 is a table showing the examples of the fourth test results obtained by using the method for producing laser-welded tubes in accordance with the invention;

FIG. 13 is a table showing the examples of the fourth test results obtained by using the method for producing laser-welded tubes in accordance with the invention;

FIG. 15 is a table showing the examples of the fifth test results obtained by using the method for producing laser-welded tubes in accordance with the invention;

FIG. 16 is a table showing the examples of the fifth test results obtained by using the method for producing laser-welded tubes in accordance with the invention;

DESCRIPTION OF THE PREFERRED EMBODIMENTS

The present invention will be detailed below referring to the accompanying drawings showing the embodiments of the invention.

Figure 1:
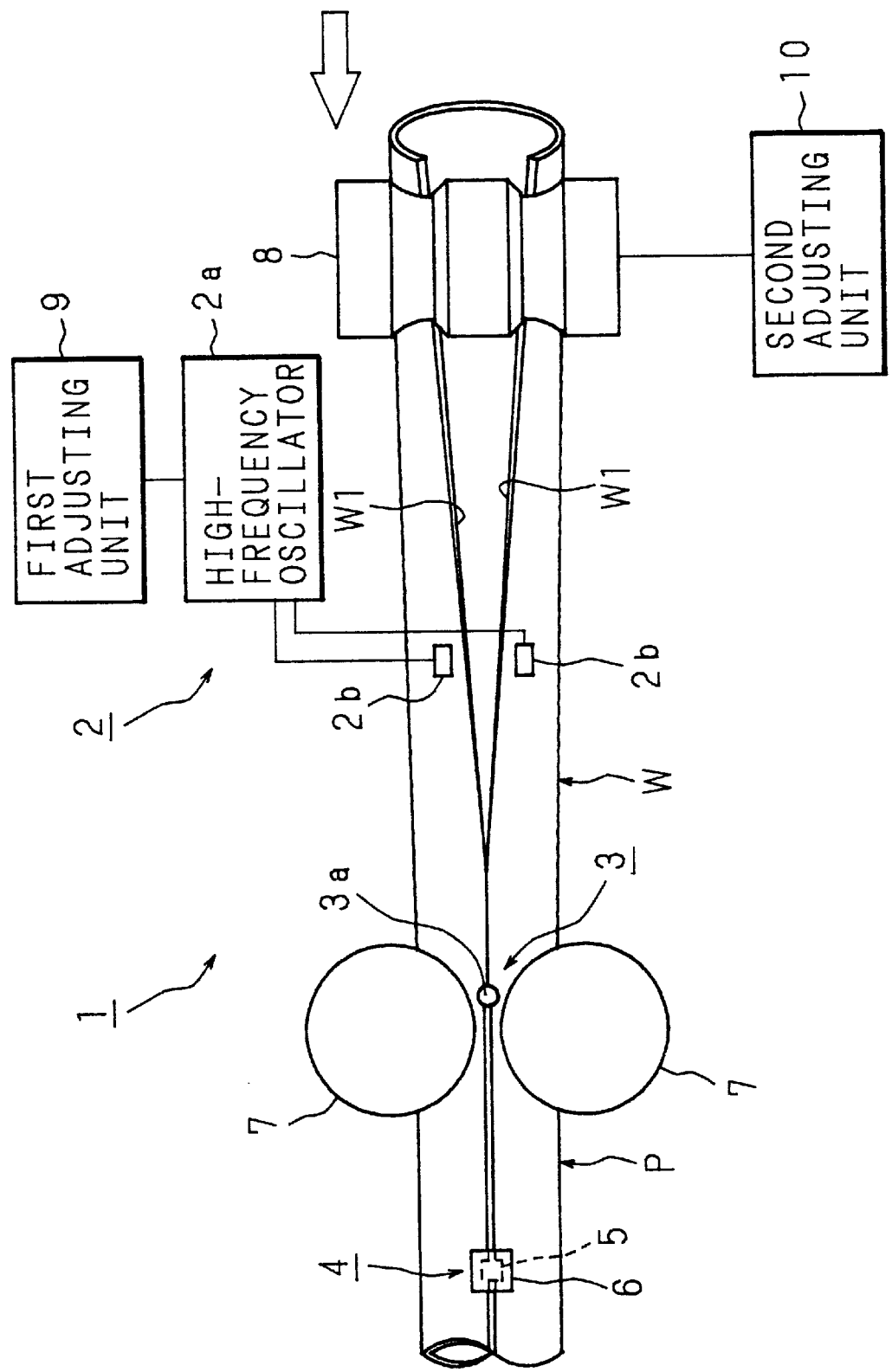
FIG. 1 is a view showing the structure of an apparatus for producing laser-welded tubes in accordance with the invention.

FIG. 1 is a view showing the structure of an apparatus for producing laser-welded tubes in accordance with the invention. An apparatus 1 for producing laser-welded tubes has a high-frequency heating unit 2, a laser welding unit 3 and a bead cutting unit 4 arranged in the transfer direction of metal band W (in the direction of the hollow arrow shown in the figure) from the upstream side to the downstream side.

The high-frequency heating unit 2 has a high-frequency oscillator 2a and contact tips 2b, 2b which receive high-frequency current from the oscillator 2a and supply the high-frequency current to edges W1, W1 of metal band W before welding. The laser welding unit 3 has a laser oscillator (not shown), a light-guiding tube (not shown) and a welding torch 3a. The bead cutting unit 4 has a fixed cutting tool 5 and a tool holder 6 for holding the fixed cutting tool 5.

Near the laser welding unit 3, squeeze rolls 7, 7 are provided to control the abutting shape of edges W1, W1 of metal band W. Furthermore, on the upstream side of the production line shown in FIG. 1, a breakdown stand having a plurality of horizontal rolls for performing initial forming including the forming of the edges of metal band W, a cluster stand having a plurality of side rolls for performing the forming of the central section of metal band W and a fin-pass stand having a plurality of horizontal rolls for performing finish forming are provided in the order from the upstream side. In FIG. 1, only the horizontal roll 8 on the most downstream side of the fin-pass stand is shown and other sections are not shown.

The high-frequency current from the high-frequency oscillator 2a of the high-frequency heating unit 2 is controlled by power adjustment at a first adjusting unit 9. The rotation speeds of the rolls of the above-mentioned stands are adjusted by a second adjusting unit 10. The second adjusting unit 10 controls the transfer speed of metal band W (welded tube P) at the production line.

Next, the operation of the apparatus is described below. Metal band W is transferred in the direction indicated by the hollow arrow in FIG. 1 and metal band W is gradually formed into a cylindrical shape by the forming rolls provided on the breakdown stand, cluster stand and fin-pass stand. Edges W1, W1 of metal band W to be welded are then preheated by the high-frequency heating unit 2. After preheating, edges W1, W1 of metal band W are joined by the laser welding unit 3 while edges W1, W1 are set securely in the abutting condition by the squeeze rolls 7, 7 to form welded tube P. Welded tube P produced in this way is transferred to the downstream side and welding beads are cut and eliminated by the fixed cutting tool 5 of the bead cutting unit 4.

The preheating power at the high-frequency heating unit 2 is adjusted by the first adjusting unit 9 and the transfer speed of metal band W (welding tube P) at the production line is adjusted by the second adjusting unit 10. By these adjustments, edges W1, W1 of metal band W are preheated by the high-frequency heating unit 2 so that temperature T at edges W1, W1 of metal band W before laser welding satisfies the condition (2) described below.

$$T \geq 380 \times \exp(8.4 \times t \times (6/a)^{1.3}) \quad (2)$$

where

T: Temperature (° C.) at edges W1, W1 before laser welding t: Time (minutes) from the start of laser welding to the cutting of welding beads (Transfer time from the laser welding unit 3 to the bead cutting unit 4)

a: Thickness (mm) of metal band W

Figure 2:
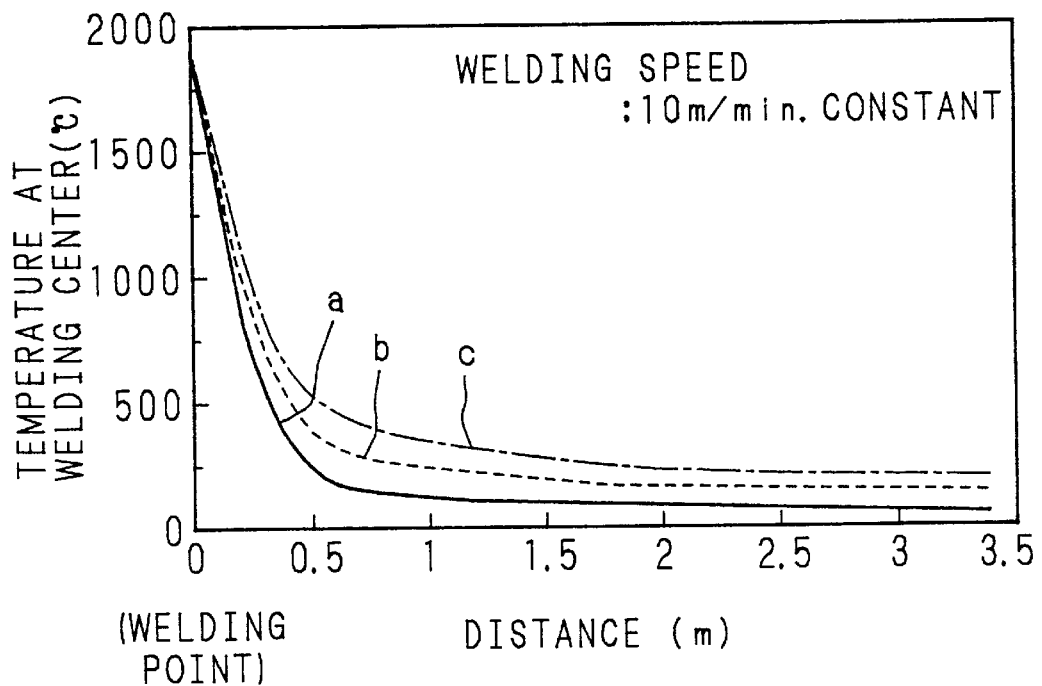
FIG. 2 is a graph showing the temperature drops at welded sections in various welding methods.

FIG. 2 is a graph showing the temperature drops at the welded sections in various welding methods. By setting the welding point to "○" when a test material is fed at a transfer speed of 10 m/minute, this graph shows the distance of the downstream movement from the zero welding point on the abscissa and shows the temperature at the welding center on the ordinate. The graph in FIG. 2 shows the temperature changes in three welding methods: a conventional laser welding method with preheating not conducted (indicated by solid line a in the figure), an example of the laser welding method of the invention with preheating conducted (600° C.) (indicated by broken line b in the figure) and another example of the laser welding method of the invention with preheating conducted (1,100° C.) (indicated by dashed line c in the figure). However, the values in the graph are not measured values but plotted values obtained on the basis of calculated heat transfer values. The preheating temperature in accordance with the invention is the temperature at the edges of the metal band before laser welding.

In the conventional laser welding method with preheating not conducted (indicated by line a), the temperature drop is extremely significant although the temperature at the welding center is the same, when compared with the two examples of the laser welding method of the invention with preheating conducted (indicated by lines b and c). This significant drop is the cause of the problem encountered in the conventional method, that is, the welding beads are hardened and cannot be cut.

In the two examples of the laser welding method of the invention with preheating conducted (indicated by lines b and c), since the gradient of the temperature drop is gentle, the hardening of the welding beads can be retarded. When the cutting unit is set at the same position, although the welding beads generated in the case of the conventional laser welding method cannot be cut, the welding beads generated in the case of the two examples of the method of the invention can be cut and eliminated easily by using a fixed cutting tool. In the case of non-austenitic steel, the cooling speed of the welding beads is decreased by preheating and martensitic transformation does not occur, thereby improving machinability. When the two examples of the laser welding method of the invention are compared, it is known that the gradient of the temperature drop is gentler and the welding beads can be cut easier in the example conducted at higher preheating temperature (1,100° C.) than in the example conducted at lower preheating temperature.

Next, the test results of the method for producing laser-welded tubes are described below referring to FIGS. 3 to 17. In the tables shown in FIGS. 3, 4, 6, 7, 9, 10, 12, 13, 15 and 16, the outer diameter d (mm) of the test material represents the finished outer diameter of the welded tube. The wall thickness a (mm) of the test material represents the thickness of metal band W (the finished wall thickness of the welded tube to be produced). Preheating temperature T (° C.) represents the temperature at edges W1, W1 of metal band W before laser welding. The welding speed (m/sec) represents the transfer speed of metal band W (welded tube P). Laser output (kW) represents the output of the laser welding unit 3. The cutting position (m) represents the distance from the laser welding unit 3 to the bead cutting unit 4. The time to cutting t (min) represents time from the start of laser welding to the cutting of welding beads (the time for transferring welded tube P from the laser welding unit 3 to the bead cutting unit 4). The possibility of cutting represents whether the cutting of the welding beads can be done actually (◯) or not (x) at the bead cutting unit 4. The conformity to condition represents whether the above-mentioned condition (2) can be satisfied (◯) or not (x). Each test result includes a test result obtained by simulation.

The graphs in FIGS. 5, 8, 11, 14 and 17 are respectively based on the test results shown in FIGS. 3 and 4, FIGS. 6 and 7, FIGS. 9 and 10, FIGS. 12 and 13, and FIGS. 15 and 16, and show whether cutting is possible or not (◯: possible, ●: impossible) with the abscissa used to represent preheating temperature T and the ordinate used to represent time to cutting t.

(First Test Example)

Figure 5:
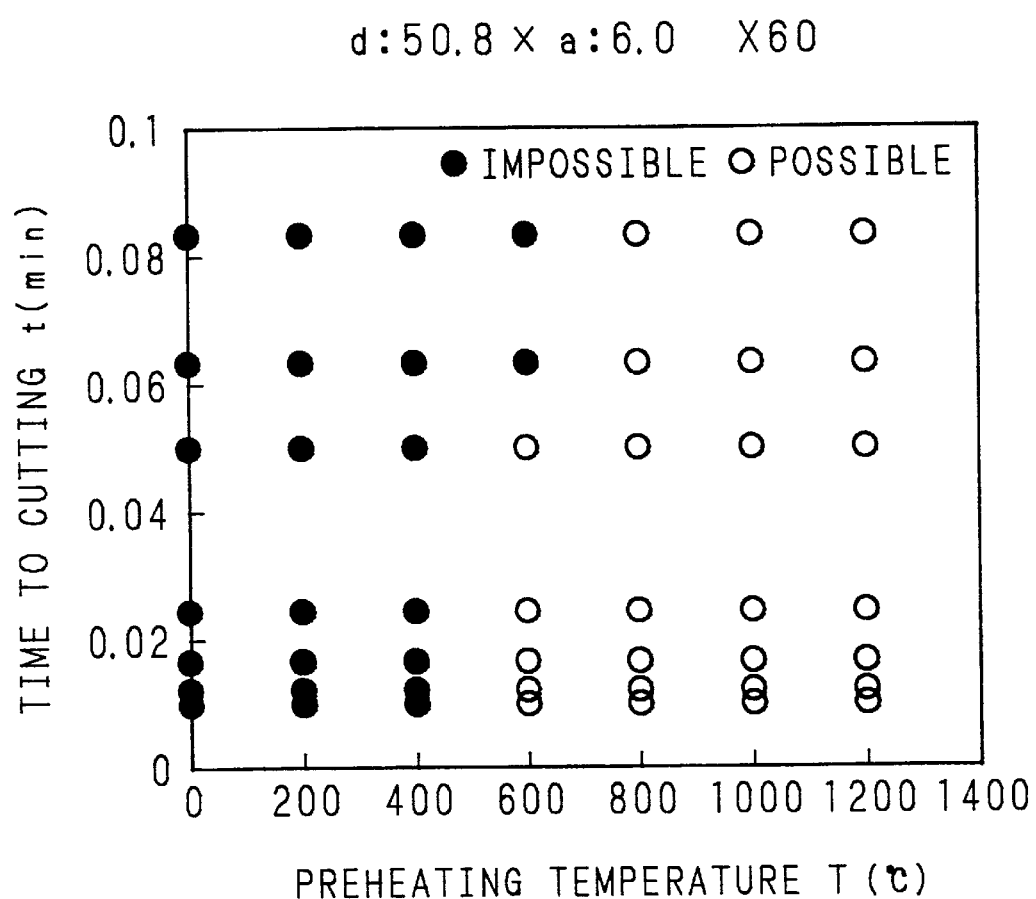
FIG. 5 is a graph showing the examples of the first test results shown in FIGS. 4 and 5.

The results of the first test example are shown in FIGS. 3, 4 and 5. The conditions of the first test example are described below.

Test material: Outer diameter d (=50.8 mm)×wall thickness a (=6 mm), carbon steel (0.06% C, 1.2% Mn, and Nb and Ni added, for API Specification, equivalent to API Specification for Line Pipe grade X60)
Preheating unit: High-frequency heating
Welding unit: Carbon dioxide laser processor
Cutting unit: Fixed cutting tool with cemented carbide chip (Second Test Example)

Figure 8:
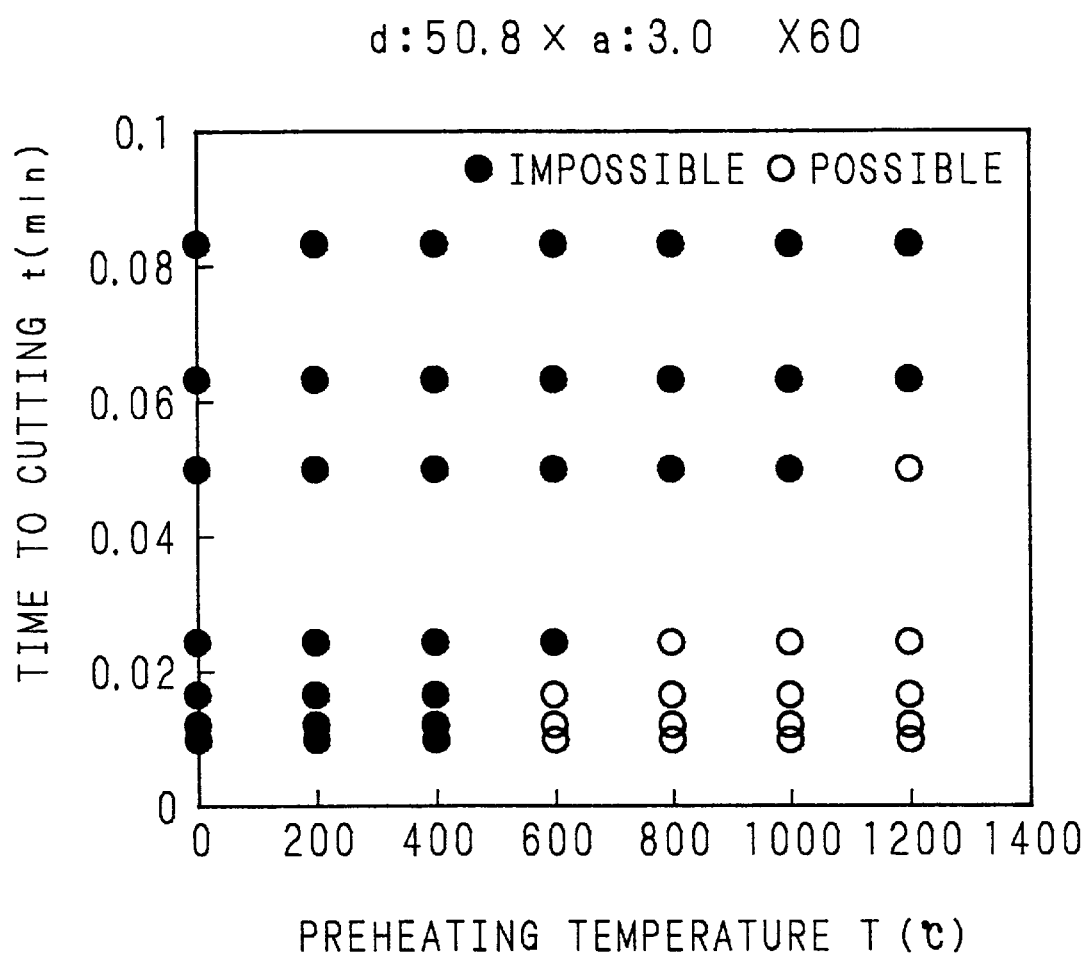
FIG. 8 is a graph showing the examples of the second test results shown in FIGS. 7 and 8.

The results of the second test example are shown in FIGS. 6, 7 and 8. The conditions of the second test example are described below.

Test material: Outer diameter d (=50.8 mm)×wall thickness a (=3 mm), carbon steel (0.06% C, 1.2% Mn, and Nb and Ni added, for API Specification, equivalent to API Specification for Line Pipe grade X60)
Preheating unit: High-frequency heating
Welding unit: Carbon dioxide laser processor
Cutting unit: Fixed cutting tool with cemented carbide chip (Third Test Example)

Figure 11:
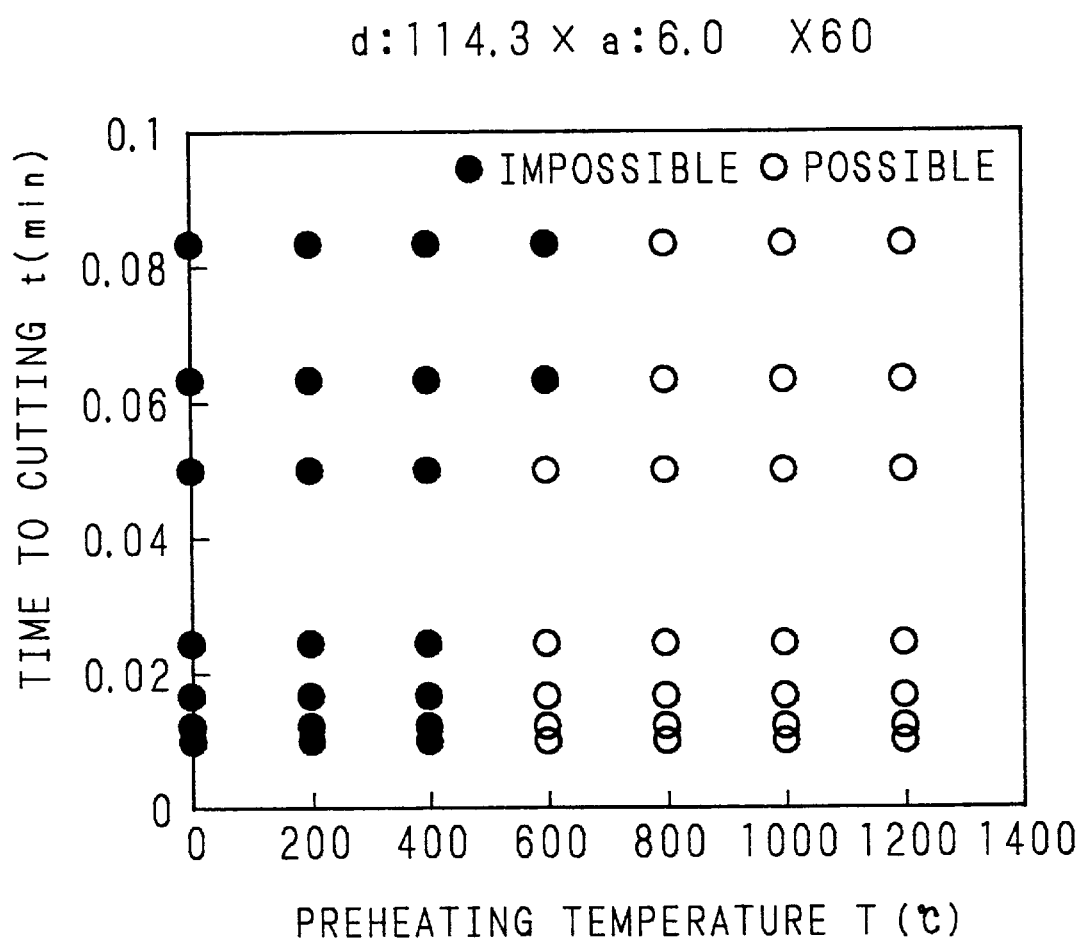
FIG. 11 is a graph showing the examples of the third test results shown in FIGS. 9 and 10.

The results of the third test example are shown in FIGS. 9, 10 and 11. The conditions of the third test example are described below.

Test material: Outer diameter d (=114 mm)×wall thickness a (=6 mm), carbon steel (0.06% C, 1.2% Mn, and Nb and Ni added, for API Specification, equivalent to API Specification for Line Pipe grade X60)
Preheating unit: High-frequency heating
Welding unit: Carbon dioxide laser processor
Cutting unit: Fixed cutting tool with cemented carbide chip (Fourth Test Example)

Figure 14:
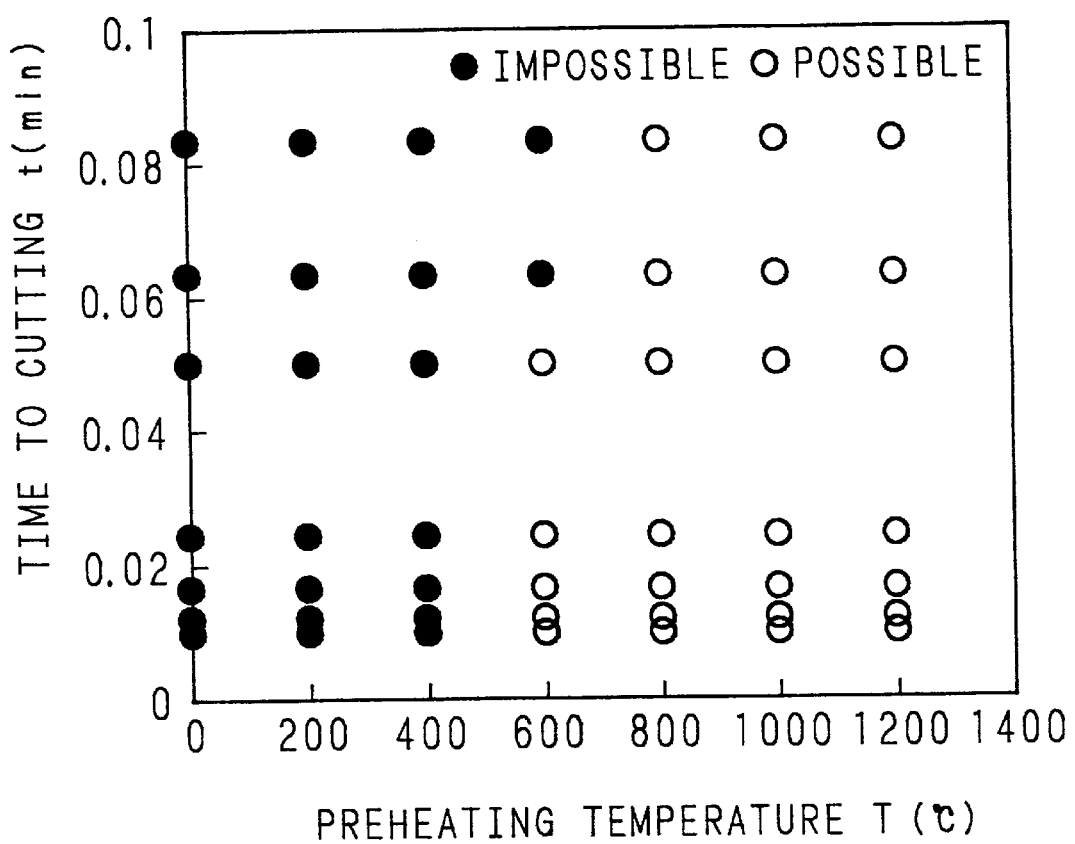
FIG. 14 is a graph showing the examples of the fourth test results shown in FIGS. 12 and 13.

The results of the fourth test example are shown in FIGS. 12, 13 and 14. The conditions of the fourth test example are described below.

Test material: Outer diameter d (=114 mm)×wall thickness a (=12.7 mm), carbon steel (0.06% C, 1.2% Mn, and Nb and Ni added, for API Specification, equivalent to API Specification for Line Pipe grade X60)
Preheating unit: High-frequency heating
Welding unit: Carbon dioxide laser processor
Cutting unit: Fixed cutting tool with cemented carbide chip (Fifth Test Example)

Figure 17:
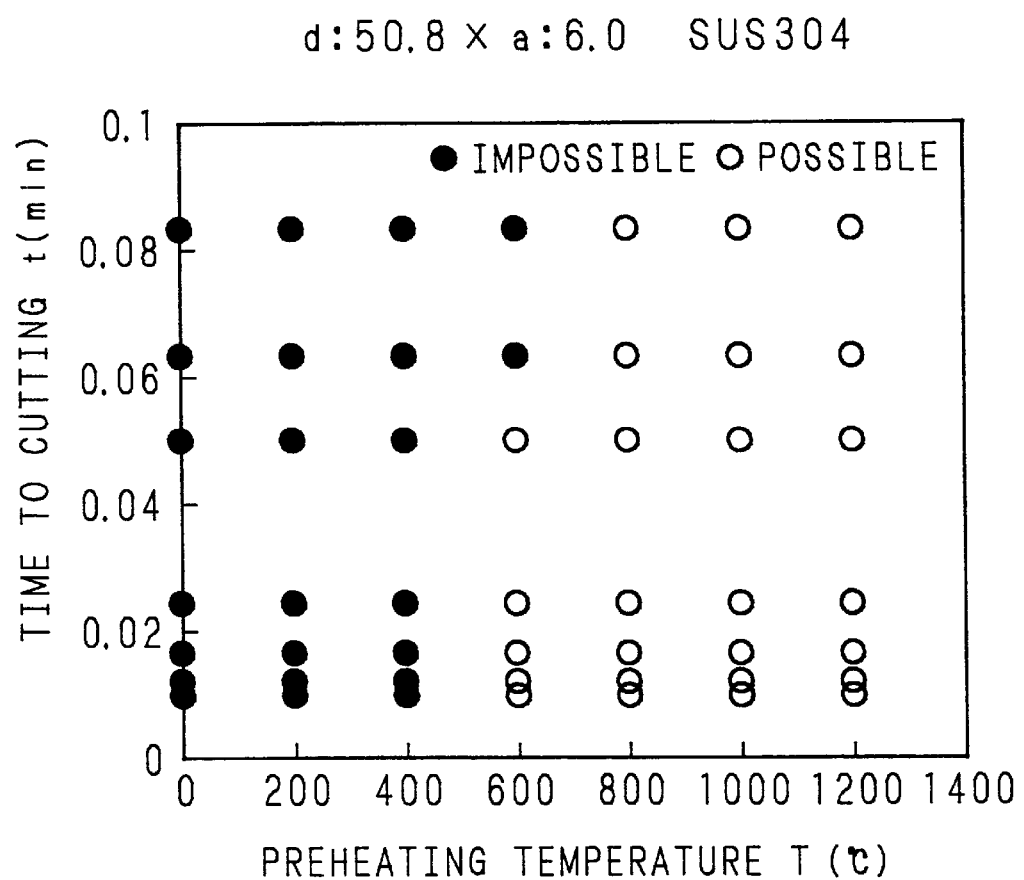
FIG. 17 is a graph showing the examples of the fifth test results shown in FIGS. 15 and 16.

The results of the fifth test example are shown in FIGS. 15, 16 and 17. The conditions of the fifth test example are described below.

Test material: Outer diameter d (=50.8 mm)×wall thickness a (=6 mm), stainless steel (equivalent to SUS304)
Preheating unit: High-frequency heating
Welding unit: Carbon dioxide laser processor
Cutting unit: Fixed cutting tool with cemented carbide chip According to the results of the above test examples, the actual cutting of the welding beads can be done when the above-mentioned condition (2) is satisfied and cannot be done when the condition (2) is not satisfied. Accordingly, the welding beads can be cut and eliminated and the accuracy of the finished dimensions of welded tube P can be improved by adjusting the degree of preheating at the high-frequency heating unit 2 and the time t from the start of laser welding to the cutting of the welding beads in view of thickness a of metal band W used as a test material in the condition (2) so that the temperature T at edges W1, W1 of metal band W before laser welding can satisfy the condition (2).

As described above, whether the welding beads can be cut or not in the production of laser-welded tubes greatly depends on the time from the start of laser welding to the cutting of the welding beads. For this reason, operability can be improved by making the welding bead cutting position changeable when the laser welding position is fixed.

Figure 18:
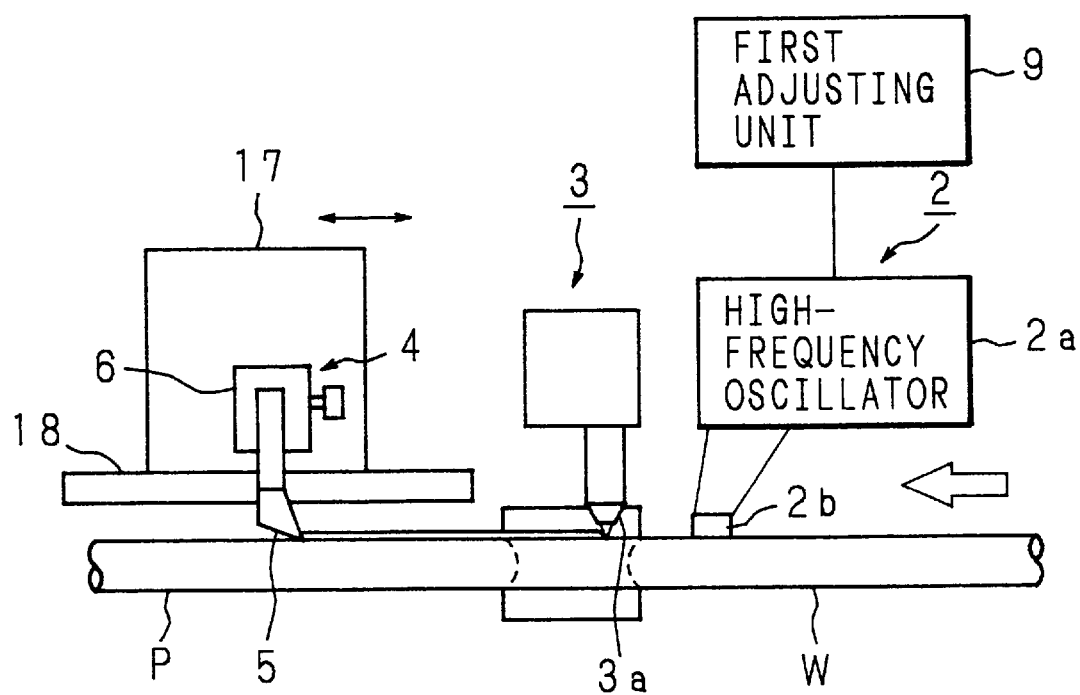
FIG. 18 is an outline view of an apparatus for producing laser-welded tubes provided with a movable cutting tool in accordance with the invention.

In the embodiment described below, a movable cutting tool is provided in view of this point. FIG. 18 shows the structure of the embodiment. A bead cutting unit 4 having a fixed cutting tool 5 and a tool holder 6 for holding the cutting tool is mounted on a slider 17. The slider 17 is movable reciprocally along a horizontal bed 18 in the direction of the production line. Parts similar to those described in FIG. 1 are denoted by the same reference numbers and the descriptions for these parts are omitted.

Metal band W is transferred in the direction indicated by the hollow arrow in the figure and subjected to preheating by a high-frequency heating unit 2, laser welding by a laser welding unit 3 and cutting by the bead cutting unit 4 in the same way as described in FIG. 1 to produce a welded tube P. The bead cutting unit 4 (fixed cutting tool 5) is movable in parallel with the transfer line as shown by arrows in the figure.

In this embodiment, when the transfer speed is slow for example, the cutting of the welding beads can be done while the time from the start of laser welding to the cutting of the welded beads is shortened substantially by moving the slider 17, on which the bead cutting unit 4 (fixed cutting tool 5) is mounted, toward the laser welding unit 3.

Figure 19:
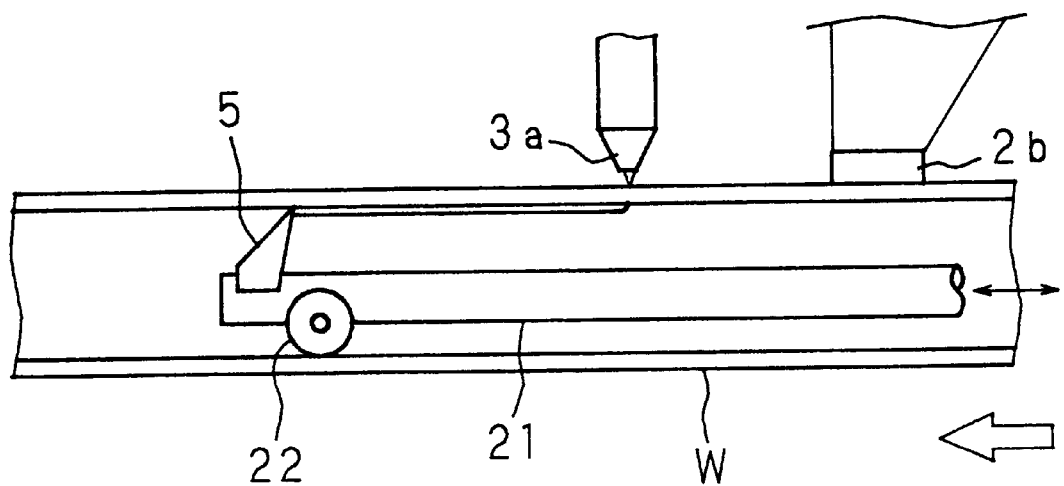
FIG. 19 is an outline view of another apparatus for producing laser-welded tubes provided with a movable cutting tool in accordance with the invention.

FIG. 19 shows a structure of an apparatus for producing laser-welded tubes in accordance with another embodiment of the invention provided with a movable cutting tool. In FIG. 19, parts similar to those described in FIG. 1 are denoted by the same reference numbers. In this embodiment, a fixed cutting tool 5 is set at the tip of a mandrel 21 which is inserted movably in the longitudinal direction inside tube-shaped metal band W. This embodiment produces the same effect as the embodiment shown in FIG. 18. In addition, the depth of cut of the fixed cutting tool 5 can be adjusted by rocking a roll 22 vertically around the fulcrum thereof.

Figure 20A:
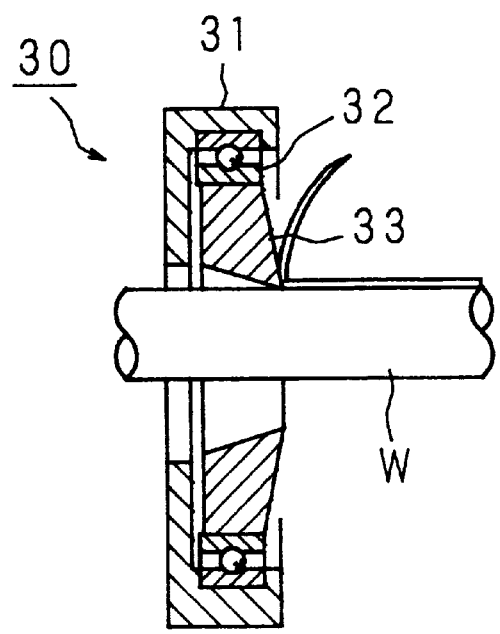
FIGS. 20(A), 20(B) and 20(C) are views showing an embodiment of a rotary bead cutting tool.
Figure 20B:
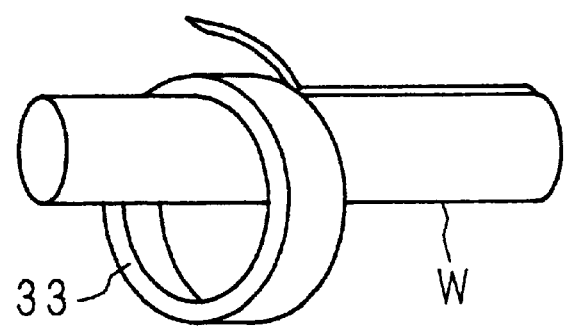
Figure 20C:
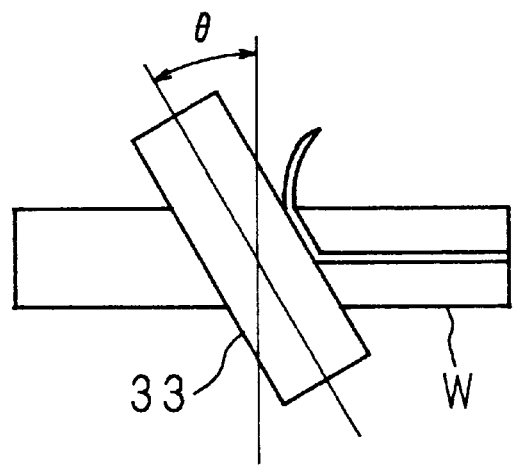

Another embodiment of the cutting tool for cutting the welding beads is described below. FIGS. 20(A) to (C) show an embodiment of a rotary bead cutting tool. In FIG. 20(A), a rotary cutting tool 30 has a housing 31, a bearing 32 and a ring cutter 33. As shown in FIG. 20(C), the ring cutter 33 is set in a condition inclined by angle θ from the line perpendicular to the axis of tube-shaped metal band W as viewed in a single plane. After receiving the pressing force of metal band W, the ring cutter 33 is rotated on its own axis by a component of the force. As a result, the ring cutter 33 cuts the outer surface of the welding bead as shown in FIG. 20(B).

In the embodiments of the invention, although a fixed cutting tool 5 and a ring cutter 33 were described above as cutting tools, it is needless to say that other cutting tools, such as a milling cutter, can be used.

Industrial Applicability

As described above, in the method for producing laser-welded tubes in accordance with the invention, laser welding is performed after the edges of a metal band to be welded are preheated to form a tube. The welding beads generated on the outer and/or inner surfaces of the welded section are cut and eliminated immediately after welding by using a cutting tool. Preheating before welding restrains the welded section from quick cooling and prevents the welding beads from hardening quickly. As a result, although laser welding is used, the welding beads can be cut and the finished dimensions of the welded tube can have higher accuracy. In addition, since the welding speed can be raised as the laser output during laser welding is larger, the selection ranges of the cutting position and preheating temperature can be extended significantly.

Furthermore, since the cutting tool is set movable in the method for producing laser-welded tubes in accordance with the invention, the time from the start of laser welding to the cutting of the welding beads can be changed. For this reason, when the line speed is low for example, the welding beads can be cut by moving the cutting tool toward the welding position.

What is claimed is:

1. A method for producing a welded tube by laser-welding edges of a metal band, said method comprising:

a step of preheating the edges of the metal band so that the temperature at the edges of the metal band before laser welding is not less than a predetermined temperature at which welding beads to be formed in a subsequent welding step are allowed to be cut and eliminated in a subsequent cutting step, a step of laser welding the preheated abutting edges of the metal band to produce a welded tube, and a step of cutting and eliminating welding beads generated on the outer or inner surfaces of the welded tube having been produced;

the predetermined temperature satisfying the following condition:

$$T \geq 380 \times \exp\left(8.4 \times t \times (6/a)^{1.3}\right)$$

where

T: The predetermined temperature (° C.)
t: Time (minutes) from the start of laser welding to the cutting of the welding beads
a: Thickness (mm) of the metal band.

2. An apparatus for producing a welded tube from a metal band by using laser welding comprising:

preheating means for preheating edges of the metal band;

laser welding means for forming a welded tube by laser welding the preheated abutting edges of the metal band, cutting means for cutting and eliminating welding beads from the welded tube having been formed, said cutting means including a cutting tool that is movable in the longitudinal direction of the welded tube; and an adjusting unit connected to the preheating means for adjusting preheating power of the preheating means to preheat the edges of the metal band so that the temperature of the edges of the metal band before laser welding is not less than a predetermined temperature satisfying the following condition:

$$T \geq 380 \times \exp\left(8.4 \times t \times (6/a)^{1.3}\right)$$

where

T: The predetermined temperature (° C.)
t: Time (minutes) from the start of laser welding to the cutting of the welding beads
a: Thickness (mm) of the metal band.

3. An apparatus according to claim 2, including adjusting means for adjusting the preheating power of said preheating means.

4. An apparatus according to claim 2, including transfer means for transferring the metal band and adjusting means for adjusting said transfer means to change a transfer speed of the metal band.

5. An apparatus according to claim 4, wherein said preheating means is heating means which uses high frequency current.

* * * * *